US012724803B2

(12) United States Patent
Bright

(10) Patent No.: US 12,724,803 B2
(45) Date of Patent: Sep. 1, 2026

(54) SYSTEM AND METHOD FOR A QUESTION GENERATOR RUNWAY FOR IMPROVING OUTPUT LATENCY IN QUESTION-AND-ANSWER SYSTEMS

(71) Applicant: Hasbro, Inc., Pawtucket, RI (US)

(72) Inventor: Gray Bright, Cranston, RI (US)

(73) Assignee: Hasbro, Inc., Pawtucket, RI (US)

( * ) Notice: Subject to any disclaimer, the term of this patent is extended or adjusted under 35 U.S.C. 154(b) by 136 days.

(21) Appl. No.: 18/972,798

(22) Filed: Dec. 6, 2024

(65) Prior Publication Data

US 2025/0190464 A1 Jun. 12, 2025

Related U.S. Application Data

(60) Provisional application No. 63/607,381, filed on Dec. 7, 2023.

(51) Int. Cl.

| | |
|---|---|
| ***G06F 40/00*** | (2020.01) |
| ***G06F 12/0871*** | (2016.01) |
| ***G06F 16/31*** | (2019.01) |
| ***G06F 16/332*** | (2019.01) |
| ***G06F 16/3329*** | (2025.01) |

(52) U.S. Cl.

CPC .... *G06F 16/33295* (2025.01); *G06F 12/0871* (2013.01); *G06F 16/328* (2019.01); *G06F 16/3326* (2019.01); *G06F 2212/1044* (2013.01)

(58) Field of Classification Search

CPC ........ G06N 3/0475; G06N 3/08; G06N 20/00; G06N 3/02; G06N 3/043; G06N 3/042; G06N 3/0464; G06N 5/04; G06N 3/045; G06N 3/044; G06N 3/094; G06N 3/092; G06N 3/091; G06N 3/09; G06N 3/096; G06N 7/02; G06N 20/20; G06N 20/10; G06N 3/088; G06N 3/0895; G06N 3/098; G06N 3/0985; G06N 5/01; G06N 5/043; G06F 16/3329; G06F 40/30; G06F 8/33; G06F 40/35; G06F 16/3344; G06F 40/20; G06F 40/40; G06F 16/248;

(Continued)

(56) References Cited

U.S. PATENT DOCUMENTS

| | | | | |
|---|---|---|---|---|
| 2019/0022545 | A1 | 1/2019 | Gunawardana | |
| 2022/0414492 | A1 * | 12/2022 | Jezewski | G06N 5/04 |

(Continued)

OTHER PUBLICATIONS

Zeng, Jingying, et al. "Let AI entertain you: increasing user engagement with generative AI and rejection sampling." arXiv preprint arXiv:2312.12457 (2023). (Year: 2023).*

(Continued)

*Primary Examiner* — Edgar X Guerra-Erazo

(74) *Attorney, Agent, or Firm* — Ashurst Perkins Coie US LLP; Colin Fowler; Willa Wu

(57) ABSTRACT

A system and method for generating trivia questions in artificial intelligence (AI)-driven gameplay. The system and method incorporate a trivia application with a user interface connected to a generative AI model. Upon receiving a trivia topic from the user interface, the system displays and reserves select responses based on expected user interactivity time. The system and method also include automatic input triggers for subsequent response generation, minimizing any latency between displaying responses to the user interface.

20 Claims, 8 Drawing Sheets

(58) Field of Classification Search
CPC .... G06F 16/9038; G06F 16/285; G06F 40/56; G06F 8/38; G06F 9/455
See application file for complete search history.

(56) References Cited

U.S. PATENT DOCUMENTS

| | | | | |
|---|---|---|---|---|
| 2024/0289546 | A1* | 8/2024 | Zhuang | H04N 21/44218 |
| 2024/0311689 | A1* | 9/2024 | Kim | G06T 13/40 |
| 2025/0005051 | A1* | 1/2025 | Khosla | G06F 16/3329 |
| 2025/0005058 | A1* | 1/2025 | Khosla | G06F 16/3344 |
| 2025/0032945 | A1 | 1/2025 | Mechlowicz | |
| 2025/0225403 | A1* | 7/2025 | Singh | G06F 16/33295 |
| 2026/0140994 | A1* | 5/2026 | Seo | G06F 16/3326 |

OTHER PUBLICATIONS

Bhowmick, Ayan Kumar, et al. "Automating question generation from educational text." International Conference on Innovative Techniques and Applications of Artificial Intelligence. Cham: Springer Nature Switzerland, 2023. (Year: 2023).*

* cited by examiner

SYSTEM AND METHOD FOR A QUESTION GENERATOR RUNWAY FOR IMPROVING OUTPUT LATENCY IN QUESTION-AND-ANSWER SYSTEMS

CROSS-REFERENCE TO RELATED APPLICATIONS

This application claims priority to and the benefit of U.S. Provisional Patent Application No. 63/607,381, filed on Dec. 7, 2023, incorporated herein by reference in its entirety.

BACKGROUND

Artificial intelligence ("AI") models often operate based on extensive and enormous training models. The models include a multiplicity of inputs and how each should be handled. Then, when the model receives a new input, the model produces an output based on patterns determined from the data the model was trained on.

Large language models ("LLMs") are trained using large datasets to enable them to perform natural language processing ("NLP") tasks such as recognizing, translating, predicting, or generating text or other content. One example of an existing LLM is ChatGPT. A recent trend in AI is to make use of general-purpose generative AI applications built on LLMs. An example of such an application is the ChatGPT family of OpenAI models. These sorts of models make use of a natural language chat interface for humans to make requests to the AI. At the time of filing, general-purpose generative AI's first attempt at responding to a user's queries is middling and requires query refinement from the user. Over the course of a given chat session, the user refines their queries, and the general-purpose model provides a better response.

DETAILED DESCRIPTION

Figure 1A:
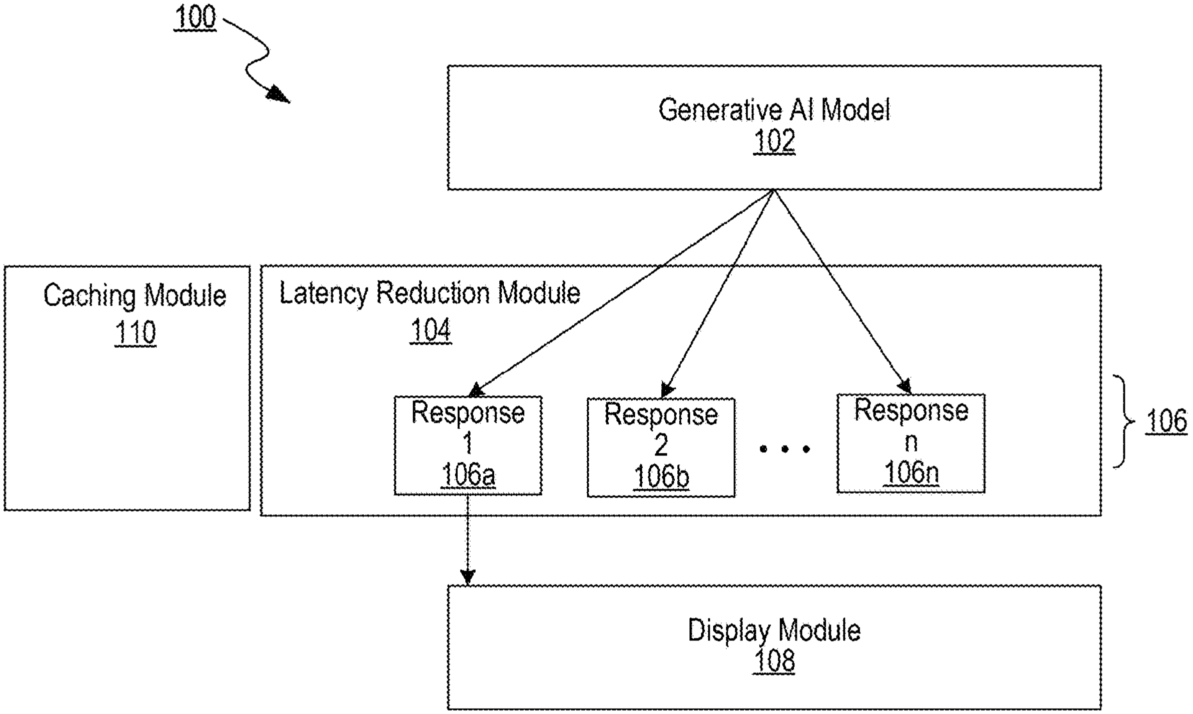
FIGS. 1A and 1B are diagrammatic views illustrating generally a question generator runaway in accordance with the invention.

Tabletop games have been popular forms of entertainment, each offering distinct experiences. The integration of generative AI technology enables a unique and dynamic gameplay experience. For example, AI technology can be leveraged to produce an extensive range of questions and prompts, based on diverse input data. An AI engine formulates trivia questions based on input parameters, such as category, difficulty level, and desired question format (multiple choice, true/false, open-ended, etc.). Latency, or the delay between user input and system response, can significantly impact the user experience, particularly in scenarios where real-time interaction is crucial, as is the case with trivia games.

One primary cause of latency in generative AI models within trivia games is the time-consuming nature of question generation. Interaction with a generative AI requires processing time. Users playing games tend not to be particularly forgiving of dead time or dead air. Relying on a generative AI to generate questions in a trivia game includes processing time delays, hindering the seamless flow of questions during gameplay. The inherently iterative nature of generative AI models, wherein multiple possibilities are explored before finalizing an output, further contributes to latency. While generative AI models do require processing time to operate, that processing time is predictable. Some embodiments described herein make use of the predictability of that processing time.

Moreover, as trivia games demand a continuous stream of questions to keep users engaged, the latency in generating each question becomes a critical factor. Users expect rapid responses and a dynamic, challenging experience. Generative AI models may fall short of meeting the real-time demands of trivia games, leading to user frustration and disengagement. Additionally, the latency problem is exacerbated by the need to tailor questions to specific user inputs or preferences dynamically. As users interact with the trivia application, generating questions in response to their choices or areas of interest adds another layer of complexity. Balancing personalized content generation with prompt responsiveness contributes to latency concerns.

The disclosed system is designed to integrate with a trivia game environment, ensuring that, when using generative AI models during trivia gameplay, there are seamless transitions from each question to the next question. The tailored framework addresses the unique challenges posed by the trivia game context and/or other gaming contexts, where reduced latency is crucial to the overall gameplay experience. To address the unwanted latency, the question generator runway seeks to ensure the responsiveness of AI-generated content in any game system, such as a trivia game system.

The question generator runway preemptively generates a pool of questions in advance. Upon receiving a user's request for trivia on a specific topic, the system anticipates future interactions, generating multiple questions and responses. The question generator runway incorporates a dynamic queuing mechanism, where the system reserves additional questions, ready to be displayed upon the user's success in answering the currently displayed question. The dynamic queuing mechanism contributes to minimizing latency, as the system continuously generates questions in the background, maintaining a reservoir of content.

While the present question generator runway is described in detail for use with trivia (such as Trivial Pursuit), the question generator runway could be applied, with appropriate modifications, to improve the playability of other applications, making the question generator runway a valuable tool for diverse applications beyond trivia games. The examples provided in this paragraph are intended as illustrative and are not limiting. Any other game referenced in this document, and many others unmentioned are equally appropriate after appropriate modifications.

The invention is implemented in numerous ways, including as a process; an apparatus; a system; a composition of matter; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description that references the accompanying figures follows. The scope of the invention is limited only by the claims and the invention encompasses numerous alternatives, modifications, and equivalents. Numerous specific details are set forth in the following description in order to provide a thorough understanding of the disclosure. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1B:
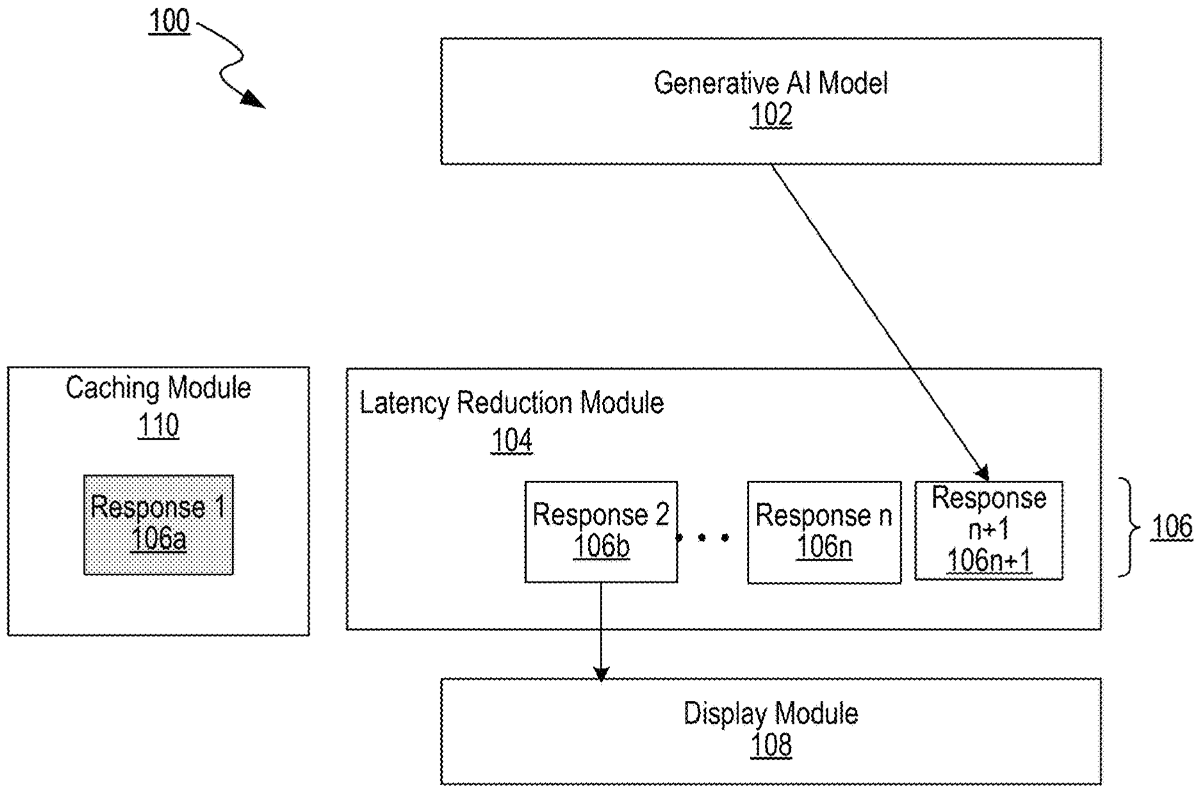

FIGS. 1A and 1B are diagrammatic views illustrating generally a question generator runaway 100. As shown in FIG. 1A, the question generator runaway 100, in some embodiments, includes generative AI model 102 comprising of neural network-based architecture, such as a large language model ("LLM"), that is configured to generate responses based on inputs from a user. In some embodiments, the generative AI model 102 generates the responses based on a user input, which is received via an application that includes a user interface. Responses 106*a*-106*n* are assigned an expected user interactivity time, which estimates the average time a user would take to respond to the corresponding response 106*a*-106*n*. For example, in the context of a trivia game, the expected user interactivity time is the time a user would take to read and answer a particular trivia question.

In some embodiments, the calculation of expected user interactivity time in the trivia game system involves a multi-faceted approach that utilizes a combination of historical data and real-time factors to dynamically determine how long users are likely to engage with specific responses. The algorithm considers the inherent complexity of each trivia question, assessing factors such as intended difficulty, linguistic complexity, question length, and the potential presence of multimedia elements. Additionally, in some embodiments, real-time variables, such as network latency, device processing capabilities, and system load, are also factored into the calculation. In some embodiments, the system learns from patterns in historical user engagement, identifying trends and adjusting the system's predictions of expected user interactivity time for each response accordingly.

The responses of the generative AI model 102, in some embodiments, are in a string format. However, in scenarios where JSON formatting is required, the configuration is specified within the query context. As is described in greater detail below, in the context of a trivia game, the generative AI model 102 is configured to receive a topic request from a user in some embodiments. The responses from a generative AI model 102, in some embodiments, are in the form of a trivia response (including a question, incorrect answers, and the correct answer). A trivia response specifically pertains to the entirety of one or more trivia questions and the corresponding set of multiple-choice answers and/or schedule of accepted answers (in view of short answer or fill-in-blank type trivia).

The responses generated by the generative AI model 102 are transmitted into a latency reduction module 104. In some embodiments, the latency reduction module 104 includes responses 106. In the context of a trivia game, the responses 106 are trivia questions and answers. In some other embodiments, the latency reduction module includes a plurality of responses, 106*a*, 106*b*, and so on through 106*n*, for a total of n responses, where n equals the number of responses. Responses 106*a-n* are assigned an expected user interactivity time.

One of the responses 106 received by the latency reduction module 104 is then transmitted to the display module 108, where the first displayed response 106*a* is displayed to the user via the user interface on the application. In some embodiments, the application is a trivia game system, wherein the first displayed response 106*a* sent to the display module 108 appears as a trivia question, facilitating user engagement. The other responses 106*b-n* that are not displayed are instead reserved within the application and readied.

Once the user interacts with the first displayed response 106*a*, one of the responses 106*b*-106*n* reserved in the latency reduction module 104 is then subsequently transmitted to the display module 108, where one of the responses 106*b*-106*n* is displayed to the user via the user interface on the application. Again, in some embodiments, the application is a trivia game system, wherein the first displayed response 106*a* sent to the display module 108 appears as a trivia question, facilitating user engagement.

As shown in FIG. 1B, in some embodiments, once the user interacts with the first displayed response 106*a*, a predetermined input is automatically sent to the generative AI model 102 to cause the generative AI model 102 to generate a subsequent response 106*n*+1. The subsequent response 106*n*+1 is generated by the generative AI model 102 during the expected interactivity time of the first response 106*a*. Thus, the processing time to generate subsequent response 106*n*+1 is hidden or concealed from the user while the user interacts with the first response 106*a*.

In some embodiments, a predetermined input in the context of the trivia game involves providing the generative AI model with specific parameters to guide the subsequent output generation. This input is carefully designed to maintain thematic consistency and prevent unnecessary repetition. For example, if a user initiates a trivia session with a user-requested topic, the predetermined input includes the same topic as a reference point for generating subsequent questions. This ensures coherence within the session and aligns with the user's initial interest.

In some embodiments, the predetermined input further includes additional query context, such as previously generated questions during the session. By considering the user's interaction history, the generative AI model avoids regenerating identical or similar questions, creating a more engaging and dynamic trivia experience.

For example, the subsequent response 106*n*+1 from a generative AI model 102, in some embodiments, is in the form of a trivia response (including a question, incorrect answers, and the correct answer). Similarly to that of the other responses 106, the subsequent response 106*n*+1 also is assigned an expected user interactivity time. The subsequent response 106*n*+1 is reserved in the latency module 104. In some embodiments, once the user interacts with the displayed response 106, the first displayed response 106*a* is removed from the latency reduction module 104 and transferred to the caching module 110.

In some embodiments, the caching module 110 is designed to store and manage previously generated trivia responses in a cache, which acts as a temporary, dynamic storage mechanism. Furthermore, the caching module 110 prevents redundant outputs. The caching module 110 is allocated in different locations, including a dedicated memory space on a host server associated with a specific user, on the user's local device, or in a session-only capacity within the generative AI's query buffer.

The query buffer, a dynamic storage region employed by the generative AI model 102, maintains contextual relevance between subsequent responses and preserves session history. The query buffer operates as a temporary holding area for queries, responses, and associated metadata during a trivia session. In some embodiments, the query buffer's primary function is to facilitate quick access to historical data, enabling the generative AI to make informed decisions based on previous interactions by applying the query context or session history to user topic requests.

In some embodiments, the caching module 110 uses vectorization techniques to transform the responses 106 stored within the caching module 110 into reduced representations, reducing data size while maintaining the contextual relevance of responses 106 stored within the caching module 110. In some embodiments, in the context of a trivia game with generative artificial intelligence (AI), maintaining contextual relevance of responses 106 is achieved by capturing semantic relationships and contextual references within the responses 106. In some embodiments, the vectorization process involves encoding the responses into mathematical vectors, preserving essential features that contribute to contextual relevance.

In other embodiments, the caching module 110 implements a two-way function encryption strategy. Upon a response 106 being transmitted to the caching module, each response 106 undergoes encryption to reduce the data size of the response 106. In some embodiments, the two-way function encryption strategy involves using code words or phrases as a form of encryption, similar to a code book. For instance, replacing recurring phrases within the response 106 such as "When was the" with a compact code such as "0010" allows for data-size reduction, since only four bits are used to represent a string. With a predefined key or code book, the system can efficiently revert these coded representations back to their original forms. The encrypted ciphertext is generally more compact than the original plaintext, leading to a reduction in data size. The reduction occurs because the encryption algorithm transforms the response 106 into a format that is less redundant and more efficiently represents the response 106. Consequently, the encrypted response 106 consumes less storage space within the caching module 110.

In other embodiments, the caching module 110 implements a one-way function encryption strategy, such as hashing techniques. When a response 106 is subjected to hashing, the hash function processes the response 106 and produces a fixed-size output. In some embodiments, the hash value is unique to the response 106, and even a small change in the input (e.g., a different response 106) will result in a significantly different hash. In some embodiments, the hashing technique creates a query context that includes hashed representations of previously generated questions, the generative AI model 102 can hash each new response 106 it generates and compare the response 106 to the hashed context.

In some embodiments, the cache management relies on a dynamic cache replacement policy. The cache replacement policy systematically tracks the usage patterns of stored responses 106, prioritizing the retention of recently accessed elements. The cache replacement policy not only enhances the efficiency of response retrieval but also mitigates the impact of storage limitations. The cache replacement policy dynamically adjusts the items stored in the cache, ensuring a more efficient utilization of available resources and thus reducing latency in gameplay. In some embodiments, outputs that are identified as newer or more frequently accessed are stored in a cache. On the other hand, outputs that are older or less frequently accessed are removed from the cache. For example, the cache replacement policy considers the time of creation or last access, providing temporal context for the trivia responses. Additionally, in some embodiments, the cache replacement policy assigns different weights or priorities based on specific criteria, such as user preferences, question relevance, or other contextual factors.

The generated responses 106 of the generative AI model 102, in some embodiments, are directed by query context. Query context includes both the query to the generative AI model (e.g. the user-requested topic) along with the query's contextual information. The query's contextual information controls the manner in which the queries should be interpreted. For example, the query's contextual information includes temporal factors that consider the timing and sequence of queries to maintain coherence and relevance over time. Additionally, in some embodiments, user-centric factors delve into individual preferences, historical interactions, and past queries, facilitating personalized and user-specific responses. In some embodiments, factors such as demographics and preferences enhance the contextual understanding of queries. External factors, like current events or trending topics, further contribute to the query's contextual information, aligning responses with the broader context of the user's environment.

In some embodiments, the generative AI model 102 precludes the redundant display of trivia outputs during a single session. Using the query context that utilizes the cache, the generative AI model 102 ensures that if a particular trivia response is already stored within the cache and has been generated during the ongoing session, the particular trivia response will be withheld from subsequent display on the user interface. The feature minimizes unnecessary repetition within a trivia game environment, optimizing the user's engagement with diverse trivia content throughout the gaming session. In some embodiments, the implementation involves real-time checks against the caching module 110, allowing the system to dynamically adjust the responses presented to the user based on the evolving context of the ongoing session. In some embodiments, the generative AI model 102 precludes the redundant display of trivia outputs across all sessions.

In some embodiments, each response generated by the AI model 102 is associated with specific performance metrics or metadata, such as time of generation. These metrics serve as quantitative indicators of the response's redundancy. The cache, designed to store the responses along with their corresponding metrics, undergoes regular updates. When a new response is generated, the associated metric is appended to the cache entry. The cache then establishes a traceable link between the response and the response's metrics.

In some embodiments, the query context is hidden from the user. The hidden parameter, while not explicitly specified in user input, enables the model to produce content that adheres to the specific pre-determined model-driven conditions, such as excluding duplicative inputs, per session or across multiple or even all sessions. In some embodiments, the hidden parameter functions in the same way as a pre-defined query context. Both the pre-defined query context and the hidden parameter guide the generated responses based on predetermined model-driven conditions.

Figure 2:
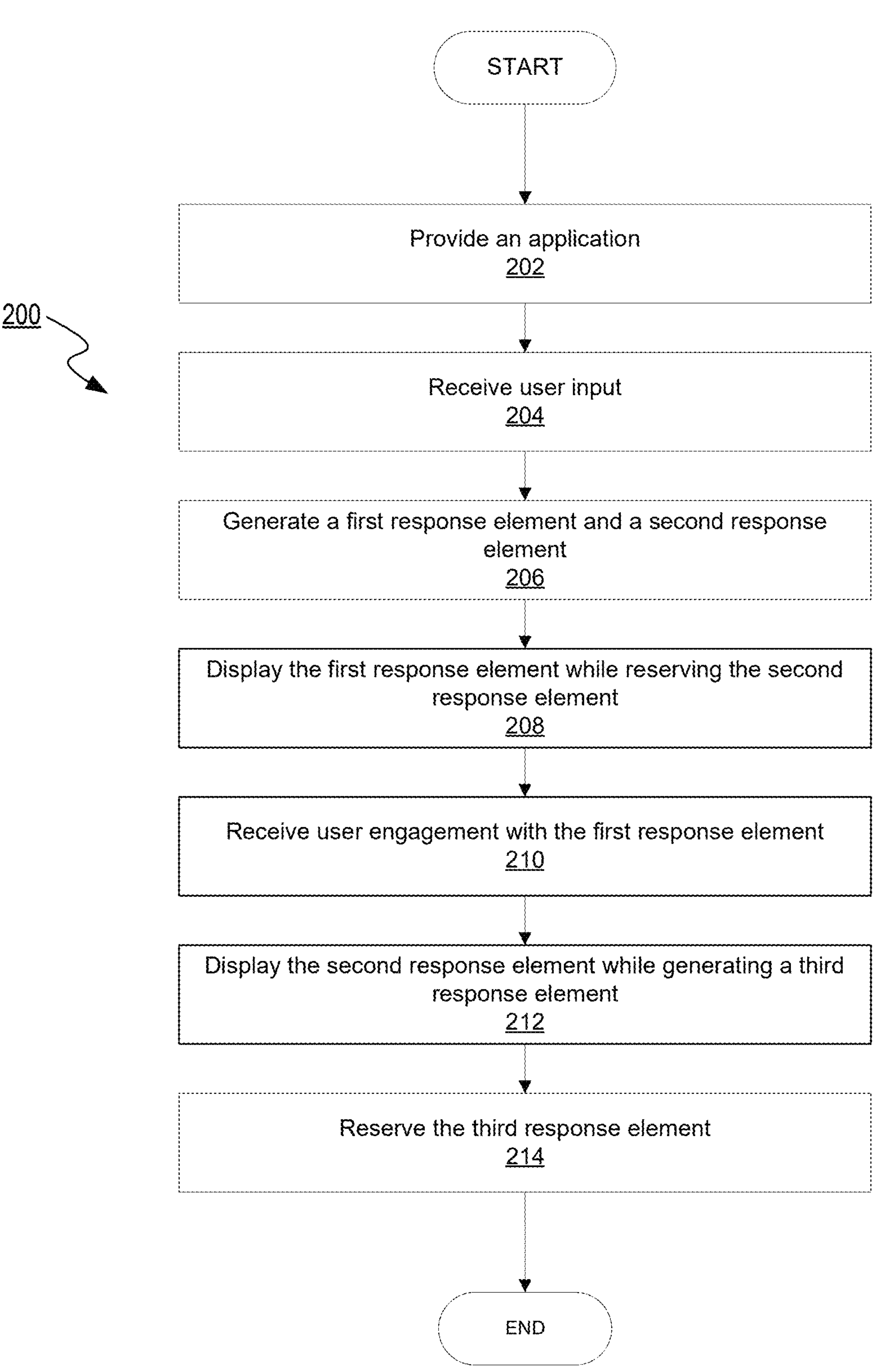
FIG. 2 is a flowchart illustrating a method of improving question-generating latency.

FIG. 2 is a flowchart illustrating a method of improving question-generating latency. The process initiates with providing an application 202. In some embodiments, application 202 is a trivia game system.

The application 202 then receives user input 204. In some embodiments, the content consists of a topic request in the context of a trivia game. For example, the user input 204 is a specific category, theme, or subject matter (e.g., "Kangaroos") that the user would have the trivia questions tailored to relate to.

Subsequently, the received user input 204 is input into a generative AI model employing a neural network-based architecture. Reference to AI engines herein employs either platform native models or external application program interfaces (APIs). External APIs (e.g., ChatGPT, MidJourney, Llama, Bard, etc.) are communicatively coupled to a game platform.

Once in the generative AI model, in step 206, the generative AI model will generate a response, consisting of at least a first response element and a second response element. In some embodiments, each response element is a trivia question and answer that is related to the received user input 204. For example, if the user requests a certain topic (e.g., "Kangaroos"), the generative AI model will generate 206 a question related to the received user input 204 (e.g., "What is a group of kangaroos called?"), and also include the answer, ensuring that each question is paired with a correct and contextually appropriate answer (e.g., "Mob").

The first response element is then displayed, and the second response element is reserved within the application in step 208. In some embodiments, the first response element is displayed on the user interface to facilitate user engagement. In some embodiments, the second response element is reserved within the application provided 202. In some embodiments, the application is a trivia game system, wherein the first response element appears as a trivia question on the front-end user interface, facilitating user engagement. The front-end interface serves as the medium through which the user interacts with the system. In some embodiments, the front-end interface encompasses visual or auditory elements to facilitate user engagement. In step 208, depending on the specific context and user preferences, the system chooses to disclose either the question and/or the question's corresponding answer, catering to individual user needs or preferences. The other response elements, such as the second response element, that are not displayed, are instead reserved within the application and readied.

In some embodiments, the provided application 202 employs at least one validation model to evaluate the generated response elements before display, accepting or rejecting the response for display. The validation model(s) operate based on factors such as contextual relevance, coherence, and adherence to predefined quality criteria. Each validation model is assigned a distinct pre-loaded query context.

In some embodiments, by leveraging the expected user interactivity time, the system assesses the number of questions to queue in the application. Then, by factoring in the expected validation time through the validation model(s), the system dynamically adapts the number of questions in the question generator runway to maintain a reduced latency. In instances where responses are rejected by the validation model(s), the system is able to backfill precisely the required number, ensuring a continuous and engaging user experience with validated questions and reduced latency.

Each of the validation model(s) reviews some predefined aspect of the input to the application. A distinctive element of each of the validation model(s) is the pre-loaded query context that is employed along with the input to the application. In some embodiments, the validation model(s) employ varied model architecture and training sets. In some embodiments, the same model architecture and training set are employed for the validation model(s).

In some embodiments, one of the validation model(s) includes a topic check. The topic check is pre-loaded with a query context that encompasses an extensive list of prohibited topics, encapsulated in a structured data format such as JSON. Through training techniques such as NLP and topic modeling, the model is adept at identifying and denying queries pertaining to these topics in a variety of means, such as utilizing algorithms like support vector machines (SVM) for classification. In some embodiments, through a process of iterative analysis, the topic check dissects the deny list, discerning patterns and underlying characteristics associated with the proscribed topics. In some embodiments, the discernment process involves the extraction of semantic, syntactic, and contextual features from textual data, enabling the model to distinguish between permissible and impermissible content.

For example, a trivia game under a particular configuration is not interested in including questions about serial killers. The topic block is approachable either explicitly (e.g., the user asked for questions about serial killers) or implicitly (e.g., the user asked for questions about a specific person who fits the definition of serial killer). However, a given topic requested may be "The Silence of the Lambs," a film that concerns a fictional serial killer, Hannibal Lecter. In such a circumstance, in some embodiments, a fictional or entertainment-related bypass is enabled by framing the topic check as to whether the trivia question is more related to the prohibited topic (e.g., serial killers) or more related to an allowed topic (e.g., entertainment and film).

In some embodiments, topic checks are executed individually and in parallel (e.g., each topic, serial killers or otherwise, is independently evaluated), and in some embodiments, multiple topics are screened simultaneously with one set of pre-loaded query context. A similar principle applies to other validation model(s) described below.

In some embodiments, one of the validation model(s) includes a localization check. The pre-loaded query context for the localization check comprises geospatial data in a standardized format, allowing for precise geographical determination. Through geospatial algorithms, the model assesses whether the generated content remains relevant and appropriate for the geographic location of the users or user profiles initiating the query, using techniques such as coordinate-based calculations and geofencing.

Appropriateness is structured either as cultural awareness or cultural taboo. In such cases, the pre-loaded query context includes variables that are determined by the location of the user. An example pre-loaded query context is "Is topic X (as received from the user input) a polite topic for general discussion in Geographic region Y (country, state, metro area, etc. of the user)." Or similarly, "Is topic X (as received from the user input) something that people in Geographic region Y (country, state, metro area, etc. of the user) are familiar enough for a trivia question of difficulty Z (easy, medium, hard, etc.)."

In some embodiments, one of the validation model(s) includes a hallucination check. The pre-loaded query context for the hallucination check specifies parameters for evaluating data veracity and coherence, allowing the check to use techniques such as sequence-to-sequence modeling and attention mechanisms. If the model detects a deviation from established criteria, the model interrupts the query and invokes the generative AI model to restart, employing mechanisms such as process control to determine whether the model rectifies the erroneous data. The hallucination check operates on the premise that generative AI output is produced on a per-character basis where the AI is predicting the next character in a given output as the output is being produced. Interrupting the main model, or requesting the main model start again from the middle of a given output causes the model to reevaluate a given output from an intermediate position of the output (e.g., "try again from here") and reduces model hallucination.

In some embodiments, one of the validation model(s) includes a profanity check. In some embodiments, profanity check integrates NLP techniques like part-of-speech tagging and sentiment analysis and is equipped with a pre-loaded query context that comprises a comprehensive list of profane language and associated indicators. The list allows the check to identify instances of profanity within the generated content or gauge the likelihood of the content inducing profane language.

In some embodiments, one of the validation model(s) includes a jailbreak check. The pre-loaded query context for the jailbreak check is tailored to identify instances where a user attempts to manipulate the model by employing obscure or nonsensical queries. In some embodiments, the jailbreak check is accomplished using advanced pattern recognition algorithms or anomaly detection techniques.

An example of a pre-loaded query context employed to avoid jailbreaking is the query, "Is user input X typically considered human comprehensible speech?" Where the expected user input is always expected to be human-comprehensible, user input that is not decipherable by humans is anticipated to be an attempt at jailbreaking the main model.

In some embodiments, one of the validation model(s) includes an accuracy check. The pre-loaded query context for an accuracy check is designed to evaluate the factual correctness and authenticity of the output generated by the AI model. In some embodiments, the check involves utilizing techniques such as fact-checking algorithms and knowledge-base comparisons.

An example of a predefined query context employed to determine accuracy is to employ output from one model in a query that requests "Is model output X factually supported?" Where the pre-loaded query context is employed in the context of a trivia game, the output is a question and a set of answers, some of which are intentionally false. In such circumstances, an example pre-loaded query context is, "Does exactly one of the possible answers X factually answer question Y?" Other checks include determining whether each potential answer is distinct from other potential answers. That is, is each available answer distinctive from the other. In some embodiments, the distinctiveness of the answers depends on the intended difficulty of the question. For example, a question that referred to the main antagonist of the Zelda game franchise might refer both to Ganon and Ganondorf. These answers refer to the same individual in different states. A more difficult question would distinguish between the states whereas an easy question should not.

In some embodiments, one of the validation model(s) includes a format check. The format check is equipped with a pre-loaded query context that establishes specific formatting standards for the generated content. The check ensures that the output from the generative AI model adheres to these predefined formatting guidelines.

In some embodiments, one of the validation model(s) includes a user feedback check. In some embodiments, the pre-loaded query context includes user ratings, comments, preferences, and other relevant feedback elements. In some embodiments, the check leverages user-provided feedback through sentiment analysis or collaborative filtering techniques to assess the quality and effectiveness of the trivia questions and answers.

In some embodiments, one of the validation model(s) includes a difficulty level analysis check. The pre-loaded query context for the difficulty level analysis check analyzes the complexity of the generated content, ensuring that the generated content aligns with the cognitive capabilities and knowledge levels of the intended users. In some embodiments, the check is executed by employing algorithms such as decision trees or ensemble methods.

In some embodiments, one of the validation model(s) includes a temporal relevance check. The pre-loaded query context for the temporal relevance check enables the check to evaluate whether the generated content remains pertinent and up-to-date in relation to the prevailing temporal context. In some embodiments, techniques such as temporal analysis or trend prediction algorithms are used.

The validation model(s), each equipped with a distinct pre-loaded query context, validate the response generated by the generative AI model. The query context dictates which kind of uncertainty or variability the particular validation model is measuring. For example, if the validation model(s) included a topic check, localization check, and profanity check, the response is validated only if the response is not on the deny list of topics, appropriate for the geography of users or user profiles, and does not have instances of profanity, respectively.

In step 210, the provided application 202 receives user engagement with the first response element. Receiving user engagement in the context of trivia gameplay includes answering trivia questions, such as the displayed first response element 208. In some embodiments, step 208 involves capturing and interpreting the user's responses to the presented content. Step 208 includes actions such as selecting an answer, providing input, or making choices related to the trivia questions displayed on the user interface.

In step 212, the second response element is then displayed, and a third response element is generated via the generative AI model. As the second response element is presented to the user interface, the system concurrently initiates the generation of the subsequent response. The concurrent generation ensures that users encounter minimal delays between questions, reducing latency. In some embodiments, simultaneously with displaying the second response element and generating the third response element, the system reserves space within the application to store and manage the impending third response element.

In step 214, the third response element generated is reserved within the application. In some embodiments, step 214 involves allocating dedicated memory or storage space within the application to temporarily hold the upcoming response element.

Figure 3:
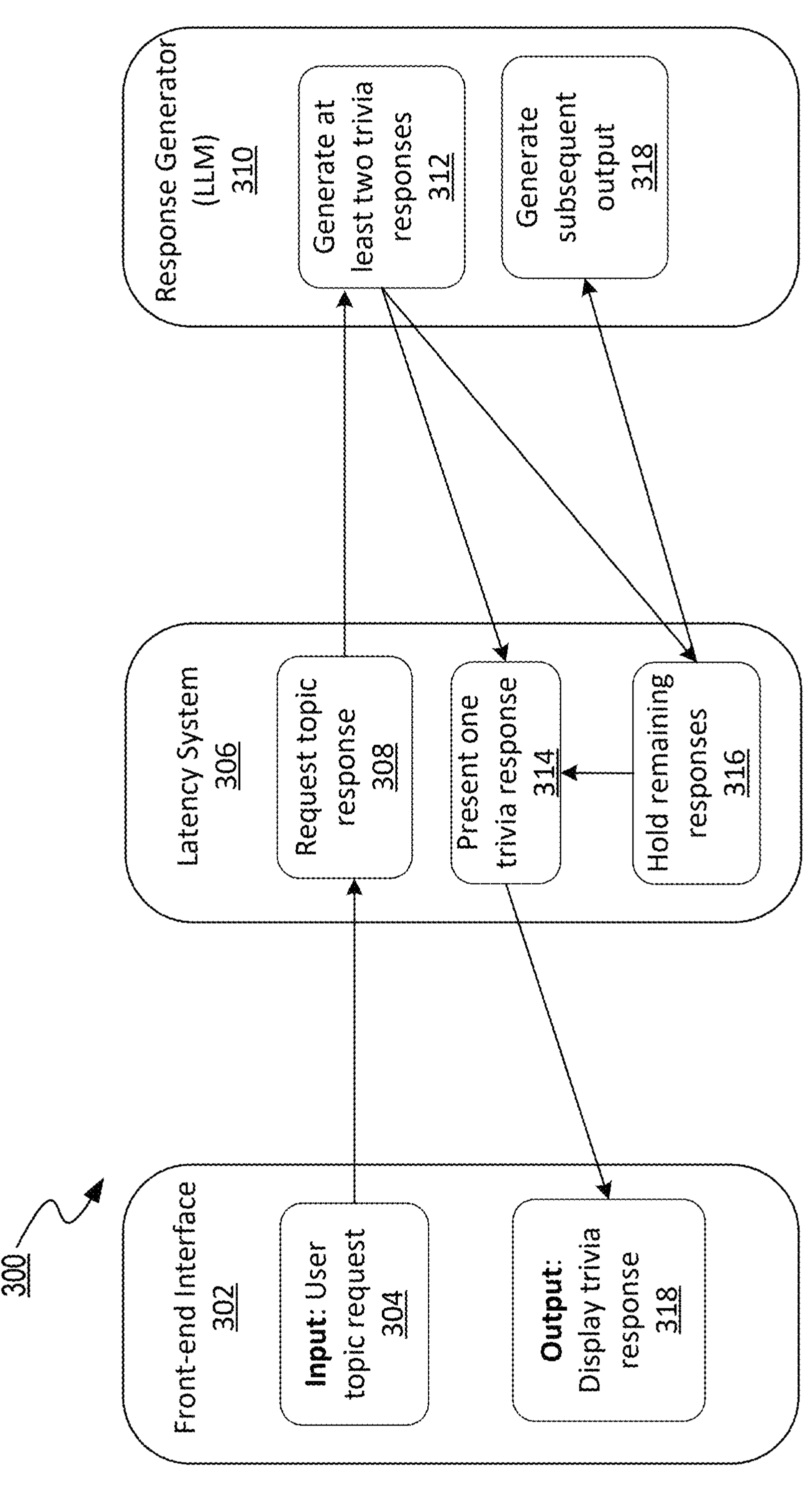
FIG. 3 is a diagram illustrating one embodiment of the architecture of the question generator runway as applied to a trivia game.

FIG. 3 is a diagram illustrating one embodiment of the architecture of the question generator runway as applied to a trivia game.

In some embodiments, the validation framework operates beginning with the front-end interface 302. The user will input a topic request 304. For example, the user requests a certain topic (e.g., "Kangaroos"). The user inputs the topic request 304 via a front-end interface of an application, such as a game or toy application. In some embodiments, the user-requested topic 304 is channeled into the latency system 306. Then, the latency system 306 causes the application to request a topic response 308 based on the user-requested topic request 304 from a response generator 310.

In some embodiments, when an update in the trivia topic is detected, the latency system 306 communicates with the cache to identify and clear existing responses associated with the outdated trivia topic. Simultaneously, the response management module initiates a command to the response generator 310, directing the response generator 310 to engage in a new cycle of response generation based on the updated trivia topic. In some embodiments, throughout the process, the latency system 306 also updates metadata or performance metrics associated with the query context to reflect the latest changes.

In some embodiments, the response generator 310 comprises of neural network-based architecture, such as an LLM. In some embodiments, the response generator is a generative AI model that operates as a deep neural network (DNN) with multiple layers of long short-term memory (LSTM) cells. These cells facilitate sequence-to-sequence processing, enabling the model to comprehend and respond to user input with a contextual understanding of various applications, such as trivia games. For example, a response generator 310 generates a trivia response 312 in response to the user topic request 304. In some embodiments, the response generator 310 generates at least two trivia responses 312 in response to one user-requested topic request.

In some embodiments, the responses are concurrently generated via a parallel processing structure employed by the response generator 310. In some embodiments, the parallel data processing mechanism includes running a plurality of central processing units (CPUs) concurrently on a single system. In some embodiments, the generative AI model is equipped with a load-balancing algorithm, which serves to dynamically allocate processing resources among the multiple responses. In some embodiments, the load-balancing algorithm takes into account factors such as algorithmic intricacy, data volume, or computational intensity. In some embodiments, the load-balancing algorithm dynamically monitors the current system load by tracking metrics like CPU utilization, memory usage, and I/O operations in real-time to make informed decisions regarding the allocation of processing resources.

In some embodiments, there is a response mechanism to help the load-balancing algorithm determine the algorithm's course of optimization. Based on an assessment of the input's size and context, and/or a current game state, the response mechanism decides whether it's advisable to divide the generated loads into smaller, more manageable segments.

For example, when three questions are sent to the application from the response generator 310 with the expected user interactivity time of thirty seconds per question and an estimated generation time of ten seconds per question, and the first question takes sixty seconds of user interactivity time to complete, a response mechanism is triggered. The time the user takes to answer the second question creates a window of opportunity for the system to generate further questions to hold within the latency system 306 in the application. In the example, there is potential to generate at least another six questions, given the longer response time of the first question. However, in a scenario where the first question only takes ten seconds to answer despite an expected user interactivity time of thirty seconds, and only one question buffer is available, a faster approach is warranted given the faster-than-expected user interactivity time of the first question. Here, the system may opt to generate questions one at a time, ensuring that by the time the user answers all presently available questions, there are further questions available to display. The procedure ensures that the response generator 310 remains synchronized with the ongoing game session, allowing for the generation of responses that are not only contextually relevant but also strategically timed.

The trivia response 312 is then channeled back into the latency system 306. Within the latency system 306, one response is categorized to be displayed 314 while the rest of the responses are held 316. The application utilizes a data structure, such as a queue, to hold the rest of the responses in readiness 316. In some embodiments, the queue dynamically manages the sequence of responses, ensuring that the system is well-prepared to present the next question upon user engagement with the displayed response 314.

In some embodiments, the latency system 306 for the remaining responses 316 involves a synchronization process to optimize the timing of presentation based on expected user engagement times. As the user interacts with the first response element, the application dynamically calculates the actual duration of user engagement. The response that is next categorized to be displayed 314 is then displayed via the front-end interface of the application 318.

In some embodiments, the expected duration of user engagement is the amount of time a user would take to read and answer the corresponding displayed trivia response. The expected user interactivity time is assigned to each of the response elements so that each response element has a corresponding user interactivity time. Once the first response element completes the response element's user engagement phase, the application triggers the display of one of the remaining response elements 316. Since the remaining response elements are already prepared, the latency system minimizes any perceptible gaps in time between responses.

In some embodiments, in the process of displaying the second response element 316, the application inputs a predetermined input to the response generator 310 based on the ongoing trivia session and user engagement data. In some embodiments, upon receiving the predetermined input, the response generator 310 dynamically adjusts the response generator's 310 parameters and initiates the generation of a subsequent output 318. The predetermined input serves as a contextual cue, instructing the response generator 310 to craft a third response element in the subsequent output 318 that aligns with the evolving dynamics of the trivia game, considering factors such as the user's previous interactions and the expected user interactivity time associated with the second response.

Figure 4:
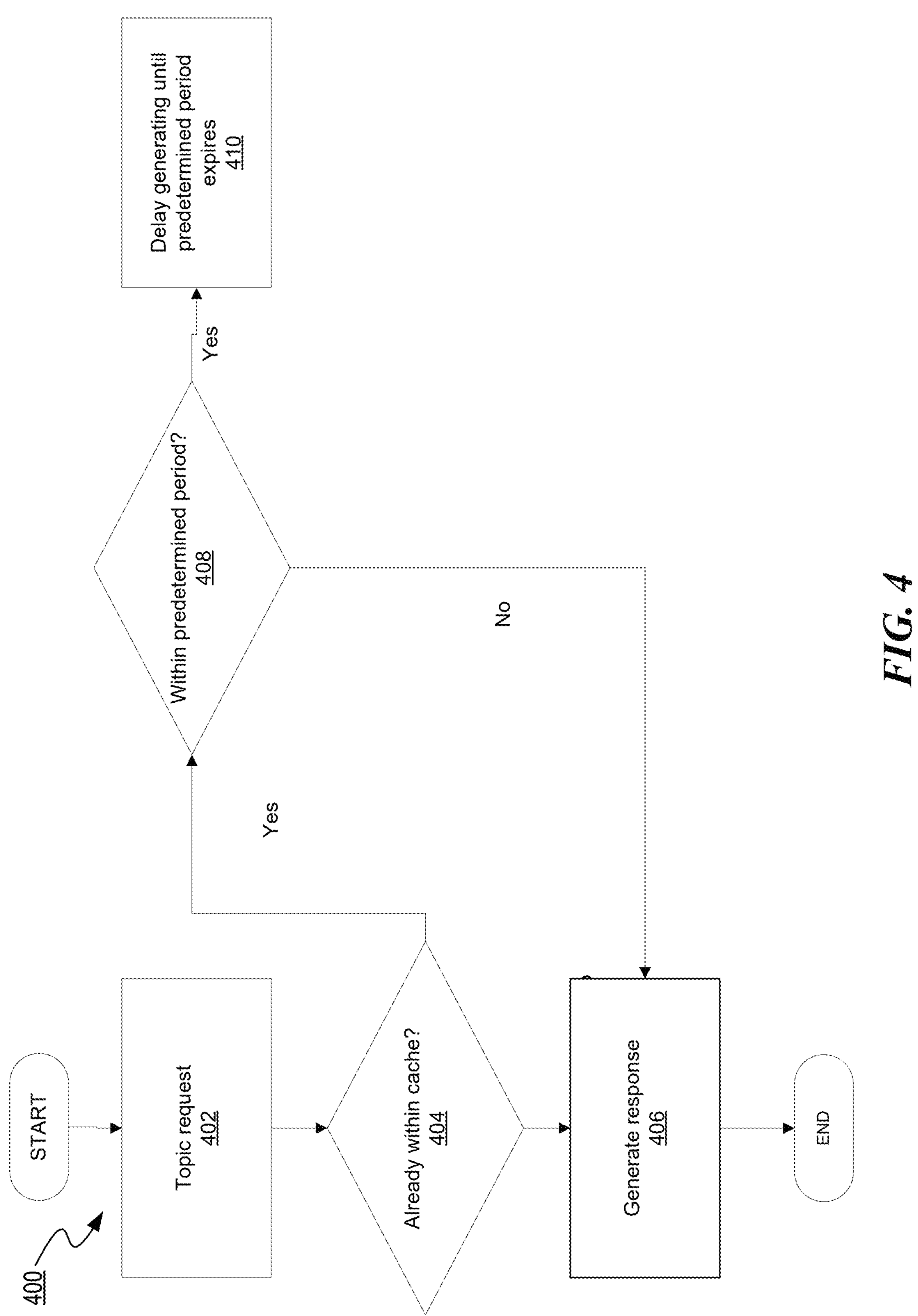
FIG. 4 is a diagram illustrating one embodiment of the architecture of the question generator runway as applied to snoozing outputs in a trivia game.

FIG. 4 is a diagram illustrating one embodiment of the architecture of the question generator runway as applied to snoozing outputs 400 in a trivia game. The question generator runway addresses cache-related considerations with query context input to the generative AI model, taking into account factors such as cache sizes, storage limitations, and the potential processing speed costs associated with an excessively large cache. To implement the snoozing functionality, the system temporarily suspends the generation and display of certain responses to prevent duplicates of the same response.

When a topic request is received 402, the query context causes the cache to be assessed to determine whether a potential response is already within the cache 404. In some embodiments, the cache consists of previously generated responses. If the response is not in the cache, the response is generated 406 via the generative AI model. On the other hand, if the response is already within the cache (e.g., the response has been generated before), the query context directs the generative AI model to determine whether the potential response is within a predetermined period 408. If the potential response is within a predetermined period, the response is delayed until the predetermined period expires 410. If the predetermined period has already expired, the potential response is generated via the generative AI model 406. In some embodiments, previously generated outputs are removed from the cache after the predetermined period expires. In the example, the query context does not have to determine whether the response is within a predetermined period 408, since previously generated responses that are older than the predetermined period would not be in the cache in the first place.

In some embodiments, the predetermined period is the current game session, ensuring that cached responses remain relevant and responsive throughout the single game session. In some embodiments, the system extends the predetermined period to encompass several game sessions, accommodating users who engage in multiple sessions over time. Additionally, in some embodiments, the predetermined period covers all game sessions. Beyond session-based parameters, the predetermined period ranges from shorter durations such as a day or a week, suitable for more transient relevance, to longer intervals such as a month. Non-temporal periods, in some embodiments, are defined based on the number of questions answered, creating a dynamic criterion where the cache's content evolves with user interactions.

In some embodiments, the query context is input into the model as a part of the query, dictating the criteria for generating subsequent trivia responses. The query context utilizes the cache, which comprises a dataset that includes previously generated outputs. In some embodiments, the dataset is stored either on the user's local device or within a profile on the server. The query context guides the generative AI model to align the generative AI model's output with specific user preferences and historical interactions. Whether stored locally or on a host server, the query context acts as a dynamic reference point for the generative AI model, adapting the responses generated by the generative AI model to evolving user engagement patterns.

In some embodiments, the algorithm dynamically adjusts the snooze duration (e.g., the predetermined period) based on the system's real-time assessment of resource availability, contributing to a balance between responsiveness and resource efficiency. For example, if the cache is tight on resources, the snooze duration may be lowered so that a smaller number of previously generated responses need to be stored within the cache.

Figure 5:
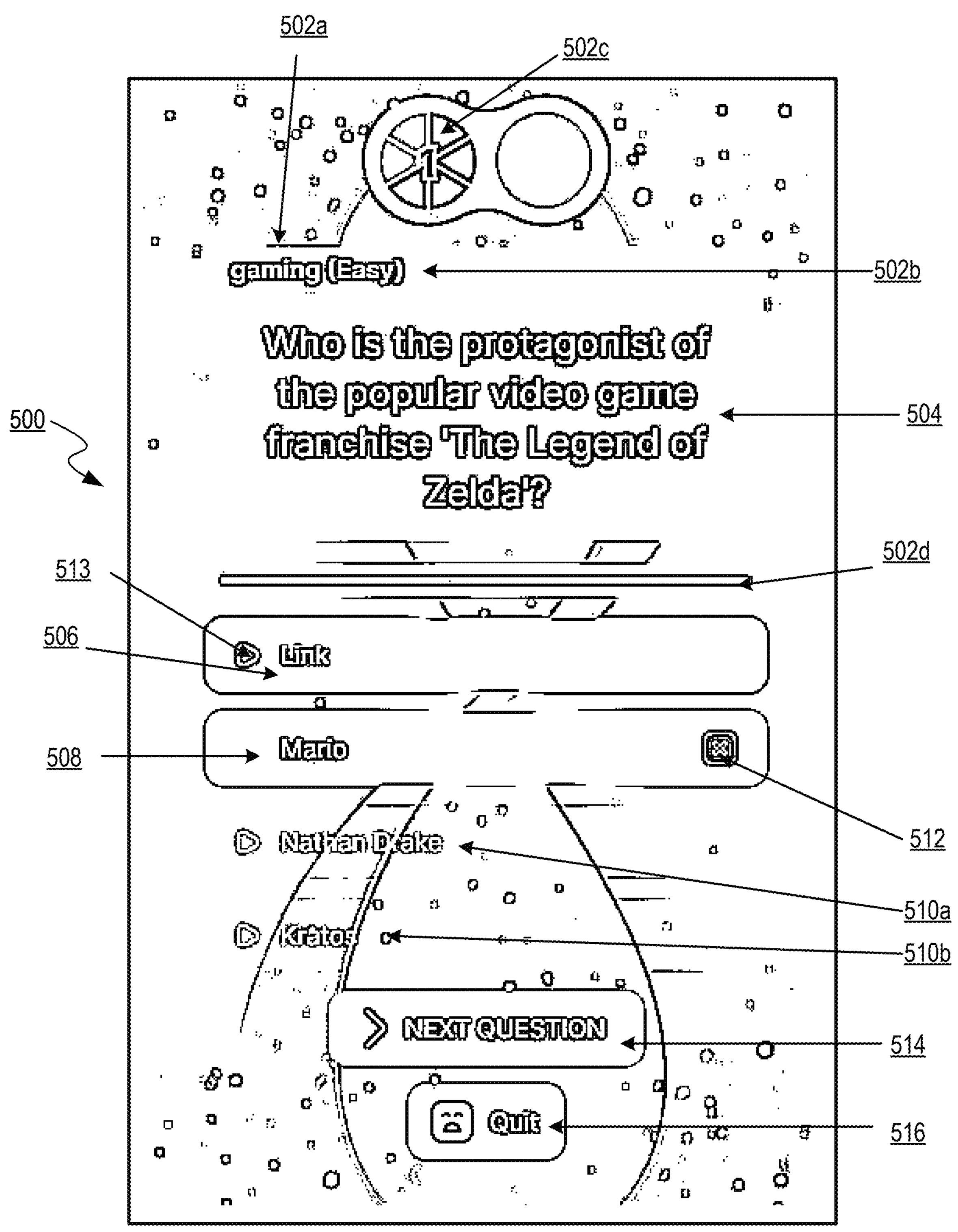
FIG. 5 is a screenshot of one embodiment of the front-end interface as applied to a trivia game.

FIG. 5 is a screenshot of one embodiment of the front-end interface 500 as applied to a trivia game. In some embodiments, the front-end interface 500 includes headers 502. In some embodiments, the headers 502 include a variety of information helpful to the user, such as the user-requested topic 502*a* or the difficulty level of the trivia game 502*b*. Further headers include, but are not limited to: 1) a progress indicator 502*c* graphically represents the user's advancement through the trivia game, providing a tangible sense of achievement and urgency, and 2) a timer 502*d* that displays the remaining time for answering each question.

A question 504 is displayed on the front-end interface 500. In some embodiments, below each question 504, a set of answer options (506, 508, 510*a*, 510*b*) is presented, allowing users to select their preferred answer by clicking or tapping the corresponding option. Additionally, in some embodiments, one or more supplementary features like a leaderboard, social sharing options, or in-game chat functionality are integrated into the interface, depending on the game's design. Once the user submits their answer, the incorrect answer 508 is highlighted with a second visual icon 512, and similarly, the correct answer 506 is highlighted using a first visual icon 513. In some embodiments, selected answers 506 are visually highlighted for clarity. In some embodiments, there is a progression button 514 that enables users to advance to the next question, ensuring a fluid and uninterrupted gameplay experience. In some embodiments, there is a quitting button 516, configured so that the user can leave the gaming experience at any time.

In some embodiments, a session management module retains essential session information, including the current state of the trivia game, user progress, or relevant metadata. The session management module allows for seamless transitions between different phases of gameplay, such as starting, pausing, and resuming sessions. Internally, the session management module employs data structures like hash tables or linked lists to organize and index trivia sessions to enable efficient retrieval and modification of session-related data, reducing latency during interactions for users.

In some embodiments, the game conclusion protocol is caused by either the user interacting with the quitting button 516 or running out of game resources. For example, the game conclusion protocol interacts with the trivia application's resource tracking system, which monitors the consumption of various game resources, such as lives (e.g., in the game Trivial Pursuit, the game resource is called "Wedges," which end the game once fully consumed). The protocol constantly evaluates the availability of these resources, triggering the termination sequence when predefined thresholds are met. In some embodiments, upon initiation, the game conclusion protocol communicates with the cache management system, directing the systematic clearance of any reserved generated trivia responses from the cache. The systematic clearance includes the removal of responses that were previously set aside for engagement during the ongoing session. The cache system is then dynamically adjusted to reflect the conclusion of the session, ensuring a fresh cache for subsequent gameplay. Furthermore, the game conclusion protocol signals the generative AI model to stop generating new trivia responses.

Computing Platform

Figure 6:
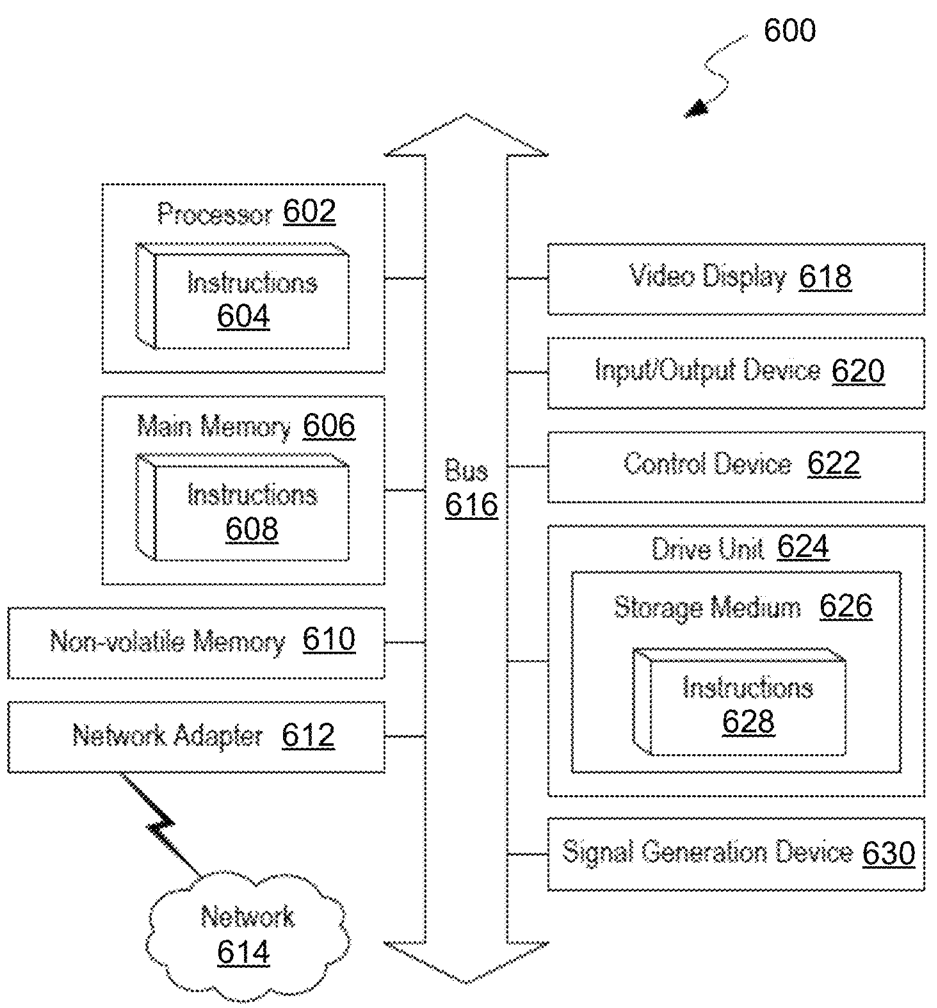
FIG. 6 is a block diagram illustrating an example computer system, in accordance with one or more embodiments.

FIG. 6 is a block diagram illustrating an example computer system 600, in accordance with one or more embodiments. In some embodiments, components of the example computer system 600 are used to implement the software platforms described herein. At least some operations described herein can be implemented on the computer system 600.

In some embodiments, the computer system 600 includes one or more central processing units ("processors") 602, main memory 606, non-volatile memory 610, network adapters 612 (e.g., network interface), video displays 618, input/output devices 620, control devices 622 (e.g., keyboard and pointing devices), drive units 624 including a storage medium 626, and a signal generation device 620 that are communicatively connected to a bus 616. The bus 616 is illustrated as an abstraction that represents one or more physical buses and/or point-to-point connections that are connected by appropriate bridges, adapters, or controllers. The bus 616, therefore, includes a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus (also referred to as "Firewire").

In some embodiments, the computer system 600 shares a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 600.

While the main memory 606, non-volatile memory 610, and storage medium 626 (also called a "machine-readable medium") are shown to be a single medium, the terms "machine-readable medium" and "storage medium" should be taken to include a single medium or multiple media (e.g., a centralized/distributed database and/or associated caches and servers) that store one or more sets of instructions 628. The term "machine-readable medium" and "storage medium" shall also be taken to include any medium that is capable of storing, encoding, or carrying a set of instructions for execution by the computer system 600. In some embodiments, the non-volatile memory 610 or the storage medium 626 is a non-transitory, computer-readable storage medium storing computer instructions, which is executable by the one or more "processors" 602 to perform functions of the embodiments disclosed herein.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 604, 608, 628) set at various times in various memory and storage devices in a computer device. When read and executed by the one or more processors 602, the instruction(s) cause the computer system 600 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually affect the distribution.

Further examples of machine-readable storage media, machine-readable media, or computer-readable media include recordable-type media such as volatile and non-volatile memory devices 610, floppy and other removable disks, hard disk drives, optical discs (e.g., compact disc read-only memory (CD-ROMS), digital versatile discs (DVDs)), and transmission-type media such as digital and analog communication links.

The network adapter 612 enables the computer system 600 to mediate data in a network 614 with an entity that is external to the computer system 600 through any communication protocol supported by the computer system 600 and the external entity. The network adapter 612 includes a network adapter card, a wireless network interface card, a router, an access point, a wireless router, a switch, a multilayer switch, a protocol converter, a gateway, a bridge, a bridge router, a hub, a digital media receiver, and/or a repeater.

In some embodiments, the network adapter 612 includes a firewall that governs and/or manages permission to access proxy data in a computer network and tracks varying levels of trust between different machines and/or applications. The firewall is any number of modules having any combination of hardware and/or software components able to enforce a predetermined set of access rights between a particular set of machines and applications, machines and machines, and/or applications and applications (e.g., to regulate the flow of traffic and resource sharing between these entities). In some embodiments, the firewall additionally manages and/or has access to an access control list that details permissions, including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example ML system 700 illustrated and described in more detail with reference to FIG. 7.

AI System

Figure 7:
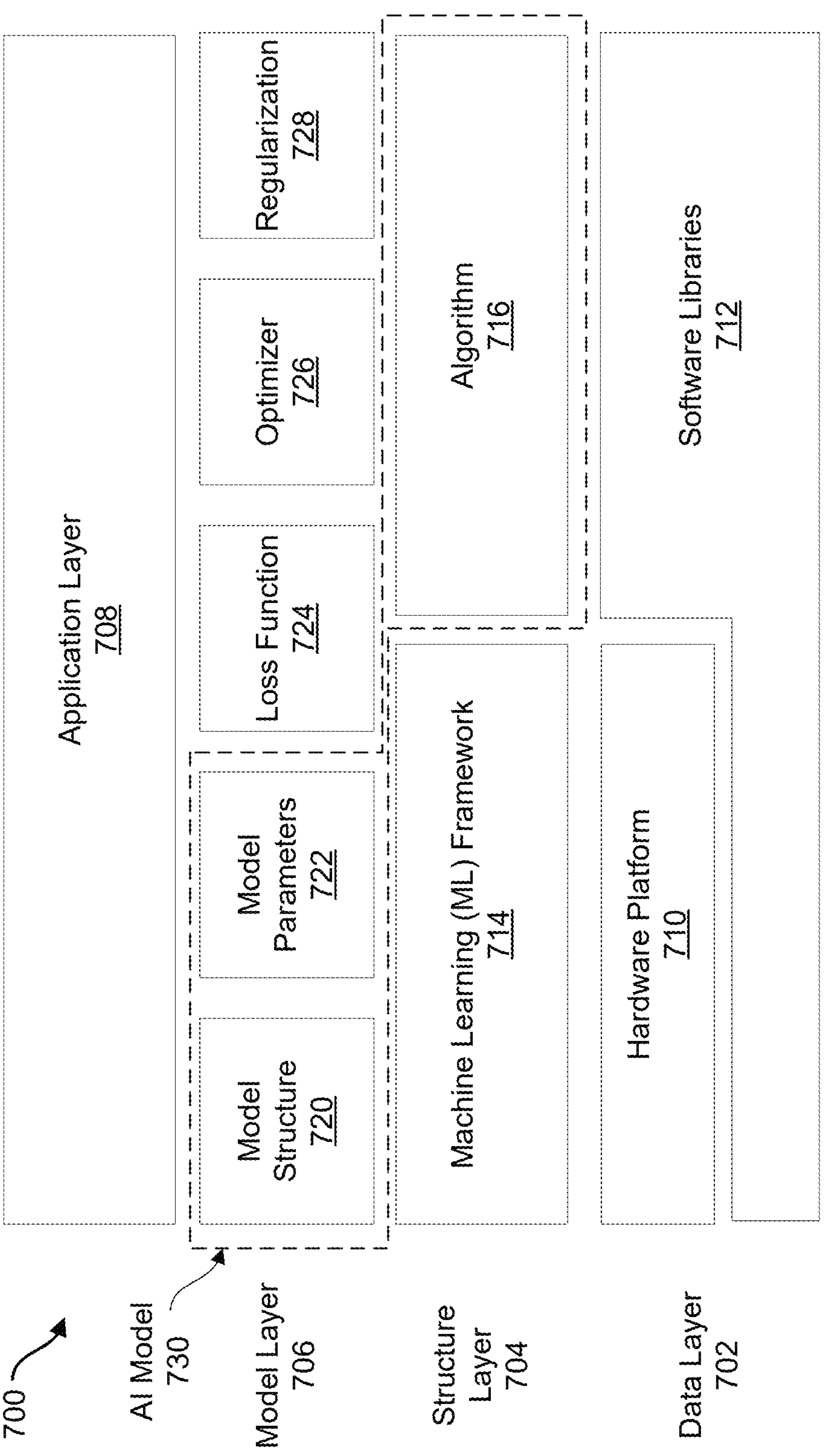
FIG. 7 is a high-level block diagram illustrating an example AI system, in accordance with one or more embodiments.

FIG. 7 is a high-level block diagram illustrating an example AI system, in accordance with one or more embodiments. The AI system 700 is implemented using components of the example computer system 600 illustrated and described in more detail with reference to FIG. 6. Likewise, embodiments of the AI system 700 include different and/or additional components or be connected in different ways.

In some embodiments, as shown in FIG. 7, the AI system 700 includes a set of layers, which conceptually organize elements within an example network topology for the AI system's architecture to implement a particular AI model 730. Generally, an AI model 730 is a computer-executable program implemented by the AI system 700 that analyses data to make predictions. Information passes through each layer of the AI system 700 to generate outputs for the AI model 730. The layers include a data layer 702, a structure layer 704, a model layer 706, and an application layer 708. The algorithm 716 of the structure layer 704 and the model structure 720 and model parameters 722 of the model layer 706 together form the example AI model 730. The optimizer 726, loss function engine 724, and regularization engine 728 work to refine and optimize the AI model 730, and the data layer 702 provides resources and support for the application of the AI model 730 by the application layer 708.

The data layer 702 acts as the foundation of the AI system 700 by preparing data for the AI model 730. As shown, in some embodiments, the data layer 702 includes two sub-layers: a hardware platform 710 and one or more software libraries 712. The hardware platform 710 is designed to perform operations for the AI model 730 and includes computing resources for storage, memory, logic, and networking, such as the resources described in relation to FIG. 3. The hardware platform 710 processes amounts of data using one or more servers. The servers can perform backend operations such as matrix calculations, parallel calculations, machine learning (ML) training, and the like. Examples of servers used by the hardware platform 710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 710 includes Infrastructure as a Service (IaaS) resources, which are computing resources, (e.g., servers, memory, etc.) offered by a cloud services provider. In some embodiments, the hardware platform 710 includes computer memory for storing data about the AI model 730, application of the AI model 730, and training data for the AI model 730. In some embodiments, the computer memory is a form of random-access memory (RAM), such as dynamic RAM, static RAM, and non-volatile RAM.

In some embodiments, the software libraries 712 are thought of as suites of data and programming code, including executables, used to control the computing resources of the hardware platform 710. In some embodiments, the programming code includes low-level primitives (e.g., fundamental language elements) that form the foundation of one or more low-level programming languages, such that servers of the hardware platform 710 can use the low-level primitives to carry out specific operations. The low-level programming languages do not require much, if any, abstraction from a computing resource's instruction set architecture, allowing them to run quickly with a small memory footprint. Examples of software libraries 712 that can be included in the AI system 700 include Intel Math Kernel Library, Nvidia cuDNN, Eigen, and Open BLAS.

In some embodiments, the structure layer 704 includes an ML framework 714 and an algorithm 716. The ML framework 714 can be thought of as an interface, library, or tool that allows users to build and deploy the AI model 780. In some embodiments, the ML framework 714 includes an open-source library, an application programming interface (API), a gradient-boosting library, an ensemble method, and/or a deep learning toolkit that works with the layers of the AI system facilitate development of the AI model 730. For example, the ML framework 714 distributes processes for the application or training of the AI model 730 across multiple resources in the hardware platform 710. In some embodiments, the ML framework 714 also includes a set of pre-built components that have the functionality to implement and train the AI model 730 and allow users to use pre-built functions and classes to construct and train the AI model 730. Thus, the ML framework 714 can be used to facilitate data engineering, development, hyperparameter tuning, testing, and training for the AI model 730. Examples of ML frameworks 714 that can be used in the AI system 700 include TensorFlow, PyTorch, Scikit-Learn, Keras, Caffe, LightGBM, Random Forest, and Amazon Web Services.

In some embodiments, the algorithm 716 is an organized set of computer-executable operations used to generate output data from a set of input data and can be described using pseudocode. In some embodiments, the algorithm 716 includes complex code that allows the computing resources to learn from new input data and create new/modified outputs based on what was learned. In some implementations, the algorithm 716 builds the AI model 730 through being trained while running computing resources of the hardware platform 710. The training allows the algorithm 716 to make predictions or decisions without being explicitly programmed to do so. Once trained, the algorithm 716 runs at the computing resources as part of the AI model 730 to make predictions or decisions, improve computing resource performance, or perform tasks. The algorithm 716 is trained using supervised learning, unsupervised learning, semi-supervised learning, and/or reinforcement learning.

The application layer 708 describes how the AI system 700 is used to solve problems or perform tasks. In an example implementation, the application layer 708 includes the response generator 314.

As an example, to train an AI model 730 that is intended to model human language (also referred to as a language model), the data layer 702 is a collection of text documents, referred to as a text corpus (or simply referred to as a corpus). The corpus represents a language domain (e.g., a single language), a subject domain (e.g., scientific papers), and/or encompasses another domain or domains, be they larger or smaller than a single language or subject domain. For example, a relatively large, multilingual, and non-subject-specific corpus is created by extracting text from online web pages and/or publicly available social media posts. In some embodiments, data layer 702 is annotated with ground truth labels (e.g., each data entry in the training dataset is paired with a label), or unlabeled.

Training an AI model 730 generally involves inputting into an AI model 730 (e.g., an untrained ML model) data layer 702 to be processed by the AI model 730, processing the data layer 702 using the AI model 730, collecting the output generated by the AI model 730 (e.g., based on the inputted training data), and comparing the output to a desired set of target values. If the data layer 702 is labeled, the desired target values, in some embodiments, are, e.g., the ground truth labels of the data layer 702. If the data layer 702 is unlabeled, the desired target value is, in some embodiments, a reconstructed (or otherwise processed) version of the corresponding AI model 730 input (e.g., in the case of an autoencoder), or is a measure of some target observable effect on the environment (e.g., in the case of a reinforcement learning agent). The parameters of the AI model 730 are updated based on a difference between the generated output value and the desired target value. For example, if the value outputted by the AI model 730 is excessively high, the parameters are adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the AI model 730 typically is to minimize a loss function or maximize a reward function.

In some embodiments, the data layer 702 is a subset of a larger data set. For example, a data set is split into three mutually exclusive subsets: a training set, a validation (or cross-validation) set, and a testing set. The three subsets of data, in some embodiments, are used sequentially during AI model 730 training. For example, the training set is first used to train one or more ML models, each AI model 730, e.g., having a particular architecture, having a particular training procedure, being describable by a set of model hyperparameters, and/or otherwise being varied from the other of the one or more ML models. The validation (or cross-validation) set, in some embodiments, is then used as input data into the trained ML models to, e.g., measure the performance of the trained ML models and/or compare performance between them. In some embodiments, where hyperparameters are used, a new set of hyperparameters is determined based on the measured performance of one or more of the trained ML models, and the first step of training (i.e., with the training set) begins again on a different ML model described by the new set of determined hyperparameters. These steps are repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) begins in some embodiments. The output generated from the testing set, in some embodiments, is compared with the corresponding desired target values to give a final assessment of the trained ML model's accuracy. Other segmentations of the larger data set and/or schemes for using the segments for training one or more ML models are possible.

Backpropagation is an algorithm for training an AI model 730. Backpropagation is used to adjust (also referred to as update) the value of the parameters in the AI model 730, with the goal of optimizing the objective function. For example, a defined loss function is calculated by forward propagation of an input to obtain an output of the AI model 730 and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. In some embodiments, other techniques for learning the parameters of the AI model 730 are used. The process of updating (or learning) the parameters over many iterations is referred to as training. In some embodiments, training is carried out iteratively until a convergence condition is met (e.g., a predefined maximum number of iterations has been performed, or the value outputted by the AI model 730 is sufficiently converged with the desired target value), after which the AI model 730 is considered to be sufficiently trained. The values of the learned parameters are then fixed and the AI model 730 is then deployed to generate output in real-world applications (also referred to as "inference").

In some examples, a trained ML model is fine-tuned, meaning that the values of the learned parameters are adjusted slightly in order for the ML model to better model a specific task. Fine-tuning of an AI model 730 typically involves further training the ML model on a number of data samples (which may be smaller in number/cardinality than those used to train the model initially) that closely target the specific task. For example, an AI model 730 for generating natural language that has been trained generically on publicly available text corpora is, e.g., fine-tuned by further training using specific training samples. In some embodiments, the specific training samples are used to generate language in a certain style or a certain format. For example, the AI model 730 is trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

In some embodiments, the language model uses a neural network (typically a DNN) to perform NLP tasks. A language model is trained to model how words relate to each other in a textual sequence, based on probabilities. In some embodiments, the language model contains hundreds of thousands of learned parameters, or in the case of a large language model (LLM) contains millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Although a general transformer architecture for a language model and the model's theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that is considered to be an encoder-only language model. A decoder-only language model accepts embeddings as input and uses auto-regression to generate an output text sequence. Transformer-XL and GPT-type models are language models that are considered to be decoder-only language models.

Because GPT-type language models tend to have a large number of parameters, these language models are considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that GPT-3 can process input text sequences to predictively generate a meaningful output text sequence.

ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model is hosted by a computer system that includes a plurality of cooperating (e.g., cooperating via a network) computer systems that are in, for example, a distributed arrangement. Notably, a remote language model employs a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real-time or near real-time) can require the use of a plurality of processors/cooperating computing devices as discussed above.

In some embodiments, inputs to an LLM are referred to as a prompt, which is a natural language input that includes instructions to the LLM to generate a desired output. In some embodiments, a computer system generates a prompt that is provided as input to the LLM via the LLM's API. As described above, the prompt is processed or pre-processed into a token sequence prior to being provided as input to the LLM via the LLM's API. A prompt includes one or more examples of the desired output, which provides the LLM with additional information to enable the LLM to generate output according to the desired output. Additionally or alternatively, the examples included in a prompt provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples is referred to as a zero-shot prompt.

In some embodiments, the llama2 is used as a large language model, which is a large language model based on an encoder-decoder architecture, and can simultaneously perform text generation and text understanding. The llama2 selects or trains proper pre-training corpus, pre-training targets and pre-training parameters according to different tasks and fields, and adjusts a large language model on the basis so as to improve the performance of the large language model under a specific scene.

In some embodiments, the Falcon40B is used as a large language model, which is a causal decoder-only model. During training, the model predicts the subsequent tokens with a causal language modeling task. The model applies rotational positional embeddings in the model's transformer model and encodes the absolution positional information of the tokens into a rotation matrix.

In some embodiments, the Claude is used as a large language model, which is an autoregressive model trained on a large text corpus unsupervised.

Consequently, alternative language and synonyms can be used for any one or more of the terms discussed herein, and no special significance is to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method for improving output latency in generative artificial intelligence (AI) driven systems, comprising:
- providing a game or toy application that includes a user interface, wherein the user interface is communicatively connected to a generative AI model;
- receiving a user input, via the user interface,
- wherein the user interface is configured to employ the user input to cause the generative AI model to generate an output including a first response element and a second response element,
- wherein each of the first response element and the second response element have an expected user interactivity time;
- receiving the output from the generative AI model via the game or toy application;
- in response to said receiving the output:
- displaying, via the user interface, the first response element configured to facilitate user engagement, and
- reserving the second response element within the game or toy application; and
- in response to user engagement with the first response element:
- displaying, via the user interface, the second response element configured to facilitate user engagement,
- automatically sending a predetermined input to the generative AI model based on the user input that causes the generative AI model to generate a subsequent output including a third response element during the expected user interactivity time associated with the second response element, and
- reserving, within the game or toy application, the third response element.

2. The method of claim 1, further comprising, prior to displaying, via the user interface, said first response element and the second response element:
- evaluating, with at least one validation model, the first response element and the second response element to determine satisfaction of a predetermined model-driven condition,
- wherein each of the at least one validation model is assigned a query context to detect adherence by the first response element and the second response element to the predetermined model-driven condition directed by the query context.

3. The method of claim 2, wherein said evaluating employs a caching module within a cache, wherein the cache includes previously generated outputs, wherein the caching module employs a cache replacement policy configured to dynamically adjust cache size and organize outputs based on access frequency or temporal relevance of the output.

4. The method of claim 1, wherein said sending a predetermined input to the generative AI model further includes a query context that causes the generative AI model to prevent the third response element from matching the first response element and the second response element.

5. The method of claim 4, wherein the query context includes previously generated outputs stored locally on a user's device or in a profile on a server.

6. The method of claim 1, wherein the outputs that are newer or more frequently accessed are retained in a cache stored locally on a user's device or in a profile on a server, and wherein the outputs that are older or less frequently accessed are removed from a cache stored locally on a user's device or in a profile on a server.

7. The method of claim 1, wherein the generative AI model is further configured to prevent displaying the output on the user interface during a session, when the output is already within a cache and generated during the session.

8. The method of claim 1, wherein the generative AI model is further configured to prevent displaying the output on the user interface when the output is within a cache.

9. The method according to claim 3, wherein the previously generated outputs are removed from the query context after a predetermined period has elapsed.

10. The method according to claim 1, further comprising, prior to transmitting the first response element and the second response element to the game or toy application:

applying a data reduction process to reduce a data size of the output while preserving a contextual relevance that indicates prior output and prevents model redundancy, wherein the data reduction process transforms the output to a reduced representation of the output, wherein the reduced representation of the output has a smaller data size than the data size of the output and maintains the contextual relevance of the output.

11. A method for improving output latency in generative artificial (AI) driven trivia gameplay, comprising:

providing a trivia application that includes a user interface, wherein the user interface is communicatively connected to a generative AI model;

receiving a trivia topic from the user interface, wherein the user interface is configured to employ the trivia topic to cause the generative AI model to generate a trivia response including a first trivia question and answer and a second trivia question and answer, wherein each of the first trivia question and answer and the second trivia question and answer have an expected user interactivity time;

receiving the trivia response from the generative AI model via the trivia application;

in response to said receiving the trivia response:

displaying, via the user interface, the first trivia question and answer for user engagement, and reserving the second trivia question and answer within the trivia application; and in response to user engagement with the first trivia question and answer:

displaying, via the user interface, the second trivia question and answer for user engagement, automatically sending a predetermined input to the generative AI model based on the trivia topic that causes the generative AI model to generate a subsequent trivia response including a third trivia question and answer during the expected user interactivity time associated with the second trivia question and answer, and reserving, via the trivia application, the third trivia question and answer.

12. The method of claim 11, wherein the trivia response is derived from at least one hidden parameter, wherein the at least one hidden parameter is pre-loaded into the generative AI model and directs the generative AI model to preclude generating duplicate outputs.

13. The method of claim 11, further comprising:

implementing a session management module that manages a trivia session, with an option to start, pause, or resume the trivia session, wherein the trivia session is a discrete period of gameplay initiated by receiving the trivia topic and managed by the trivia application.

14. The method of claim 13, further comprising:

incorporating a game conclusion protocol that triggers a termination of the trivia session upon exhaustion of allotted game resources or initiation of a new trivia session, wherein the termination of the trivia session causes clearance of any reserved trivia responses from a cache.

15. The method according to claim 11, further comprising:

updating a cache to include a performance metric associated with a query context of the trivia response;

wherein the trivia response indicates the performance metric, wherein the query context is assigned to the generative AI model;

employing the cache in the query context to detect adherence by the trivia response to a predetermined model-driven condition directed by the query context.

16. A system for improving output latency in generative artificial (AI) driven trivia gameplay, comprising:

a trivia application equipped with a user interface, wherein the user interface is communicatively connected to a generative AI model that is configured to generate a trivia response based on a trivia topic received by the user interface;

wherein the trivia response includes a first trivia question and answer and a second trivia question and answer, each of the first trivia question and answer and the second trivia question and answer having an expected user interactivity time;

wherein the trivia application is configured to receive the trivia response generated by the generative AI model;

a display module configured to display, via the user interface, the first trivia question and answer or the second trivia question and answer for user engagement;

a latency-reduction module configured to direct the display module to, in response to said receiving the trivia response:

display, via the user interface, the first trivia question and answer for user engagement, and reserve the second trivia question and answer t within the trivia application, wherein, in response to user engagement with the first trivia question and answer, the latency-reduction module is further configured to:

direct the display module to display, via the user interface, the second trivia question and answer for user engagement, automatically send a predetermined input to the generative AI model based on the trivia topic that causes the generative AI model to generate a subsequent trivia response including a third trivia question and answer during the expected user interactivity time associated with the second trivia question and answer, and reserving, via the trivia application, the third trivia question and answer.

17. The system of claim 16, further comprising:

a latency monitoring module that continuously tracks response generation times, enabling the generative AI model to dynamically adjust generating the trivia response based on the expected user interactivity time associated with previously generated responses.

18. The system of claim 16, further comprising a feedback module, which collects user feedback from the user interface regarding relevance of the trivia response based on the trivia topic.

19. The system of claim 16, further comprising:

a response management module, configured to detect updates in the trivia topic and, in response thereto, clear the trivia response associated with the trivia topic, and initiate the generative AI model to generate a new set of trivia responses based on an updated trivia topic.

20. The system of claim 16, wherein the generative AI model employs parallel processing architecture to concurrently generate the trivia response.

* * * * *